May 1, 1962 R. L. CALKINS 3,032,742
RECORDING SEISMIC SIGNALS
Filed Jan. 10, 1958 4 Sheets-Sheet 2

Ray L. Calkins Inventor
By James A. Reilly Attorney

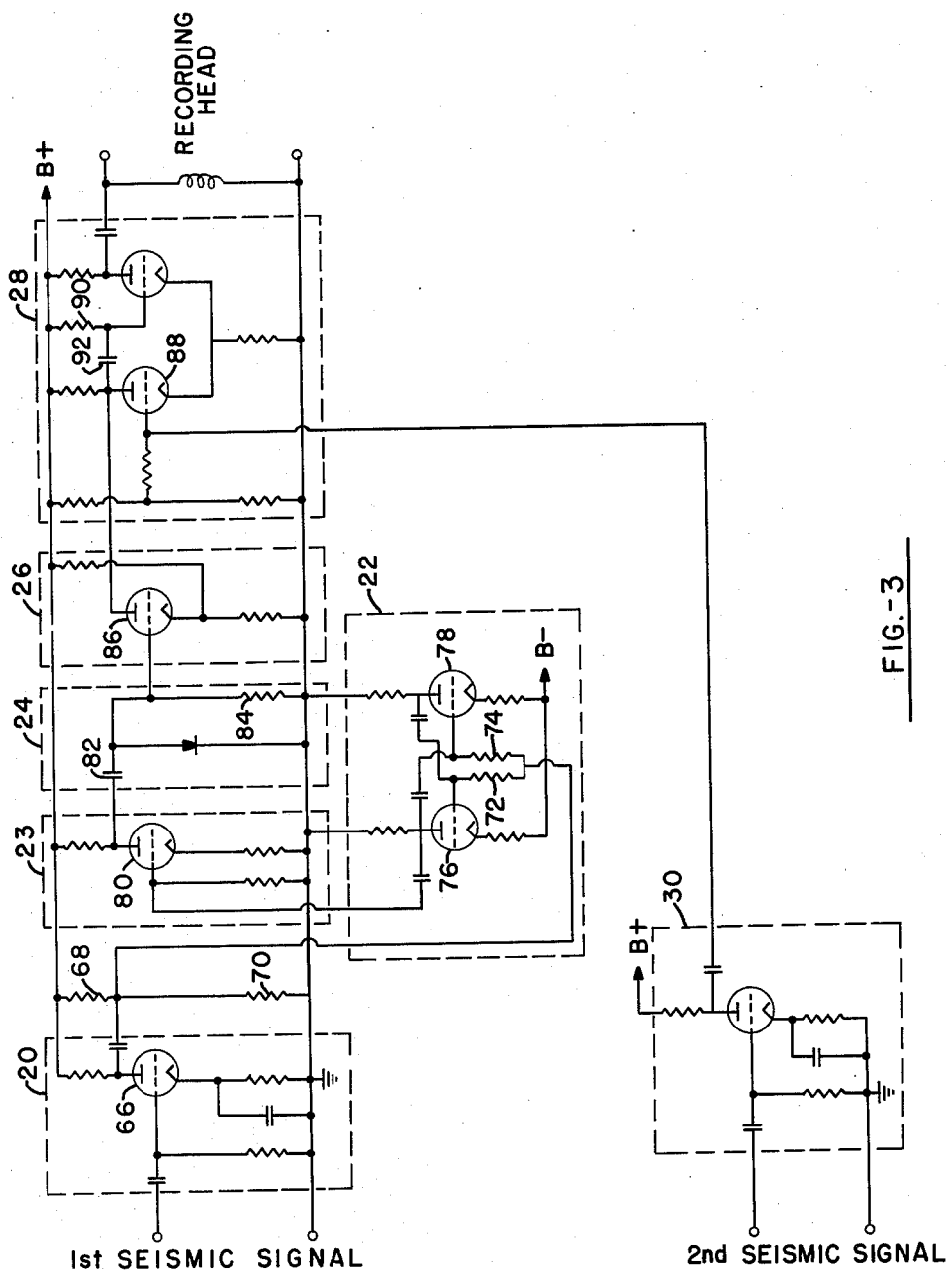

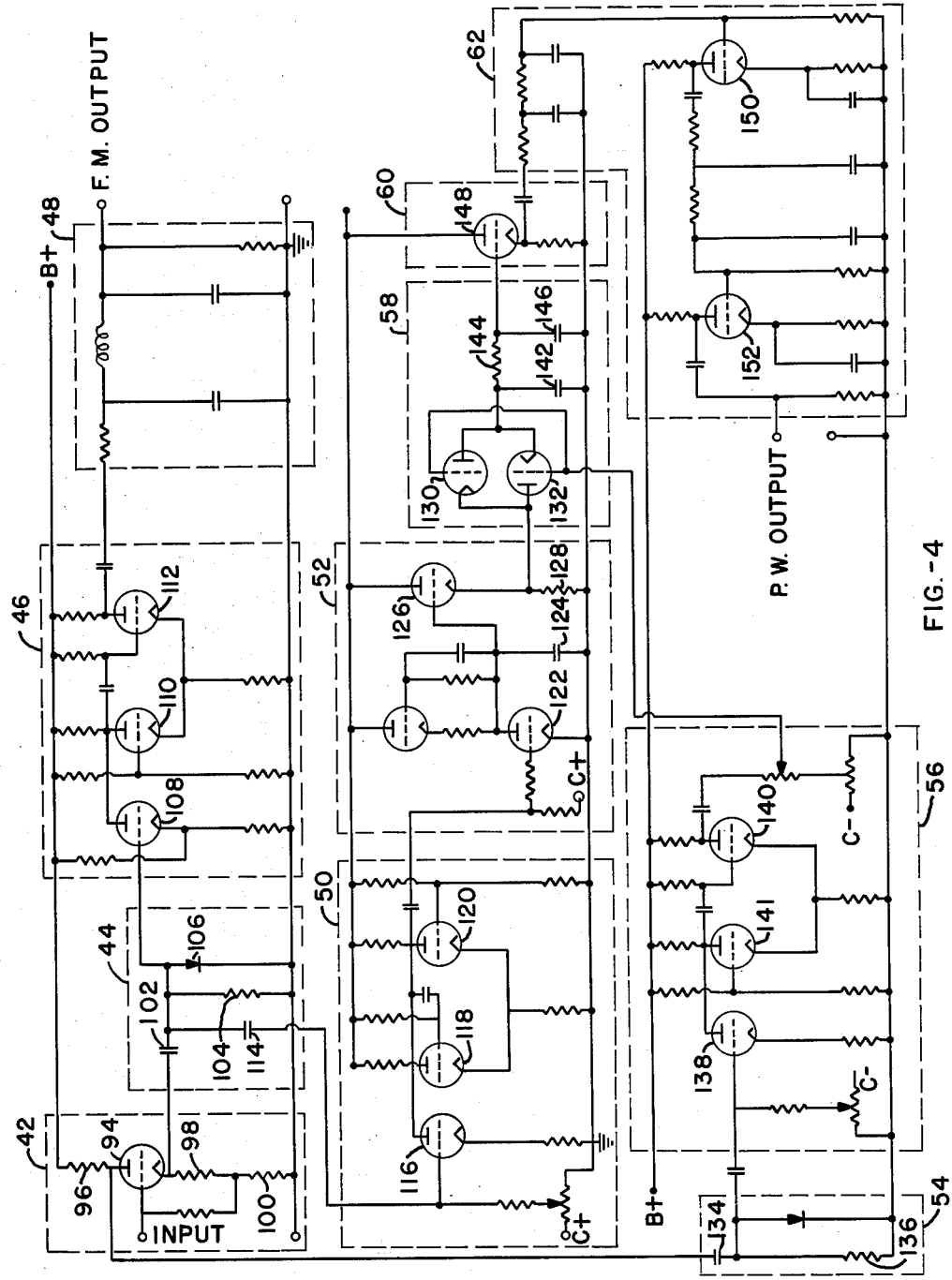

United States Patent Office 3,032,742
Patented May 1, 1962

3,032,742
RECORDING SEISMIC SIGNALS
Ray L. Calkins, Tulsa, Okla., assignor, by mesne assignments, to Jersey Production Research Company
Filed Jan. 10, 1958, Ser. No. 708,260
3 Claims. (Cl. 340—15)

This invention pertains generally to a system for recording and reproducing seismic signals. It relates more particularly to improved seismic recording systems in which two seismic information signals are recorded simultaneously as one signal on a recording medium and includes recovering the two seismic information signals from the single recorded signal.

Geophysical prospecting procedures using artificially induced seismic disturbances have found wide application in the search for petroleum and other general products in all of these methods. It is general practice to initiate an explosition or other seismic disturbances at a point near the surface of the earth and to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance points, it is possible to detect the arrival of the reflected seismic waves at the surface of the earth. Furthermore by using accurate timing devices and recording means it is possible to determine not only the magnitude of the signals received of the various geophones, but also to measure the times required for the seismic waves to travel from the disturbance point down to the various discontinuities and thence to the geophone. It is well-known to those in the art that it is possible to calculate and determine the depths of the various discontinuities beneath the surface of the earth.

The term "seismic signal" as used in this description of the invention is intended to mean the train of electrical signals which is produced by a geophone or other seismic detector in response to the reception of elastic seismic waves. The expression is also intended to include a train of electrical signals obtained by reproducing a reproducible trace recording of a seismic signal. Thus it is a popular technique in seismic methods of geophysical prospecting to record a seismic signal generated by a seismic detector in the form of a "phonographically reproducible trace" and thereafter reproduce the information recorded on the trace. Phonographically reproducible traces include magnetic traces which in recent years have found very wide acceptance as a means of recording seismic signals.

The frequencies of sound waves of interest in seismic work are between 10 cycles per second and 250 cycles per second with most records ranging only from 20–100 cycles per second. This frequency range makes the direct recording of the seismic signals on magnetic tape impractical as the efficiency of the transfer of signals of these frequencies to and from the magnetic tape is very low using the tape speeds which are customary in seismic recording. Magnetic tape equipment used to record the seismic information must then include various modulation systems. These systems include frequency modulation, pulse-width modulation and bias recording. In any event there is considerable equipment necessary in order to record the seismic signals on a magnetic recording medium. There are times, of course, when it would be desirable to have more signal channels available to record signals from more geophones or to record some of the control voltage information—that is, to record the voltage used in automatic gain control circuits of the recording equipment.

Accordingly, it is an object of this invention to double the number of signals which can be recorded without using any more recording heads or magnetic recording mediums than are presently in use. A method of accomplishing this to modulate two parameters of a single pulse carrier. A first seismic information signal is used to vary the repetition rate of the pulses of the carrier signal while a second seismic information signal is used to modulate the duration time of the pulses of the carrier signal. The doubly-modulated carrier signal is then recorded on a recording medium such as magnetic tape. The two seismic information signals thus recorded are recovered by reproducing the doubly-modulated carrier signal as recorded. The reproduced doubly-modulated carrier signal is then fed to a demodulating circuit, a part of the circuit being used to demodulate the frequency modulated part of the carrier wave signal and a part of the demodulating circuit being used to demodulate the pulse-width modulation of the carrier signal.

Additional objects and a complete understanding of the invention will be apparent from the following detailed description taken in conjunction with the accompanied drawings in which:

FIGURE 3 is a more detailed schematic diagram of a recording circuit suitable for carrying out the invention; and, FIGURE 4 is a more detailed schematic diagram of a circuit for reproducing signals recorded by the circuit of FIGURE 3.

Figure 1:
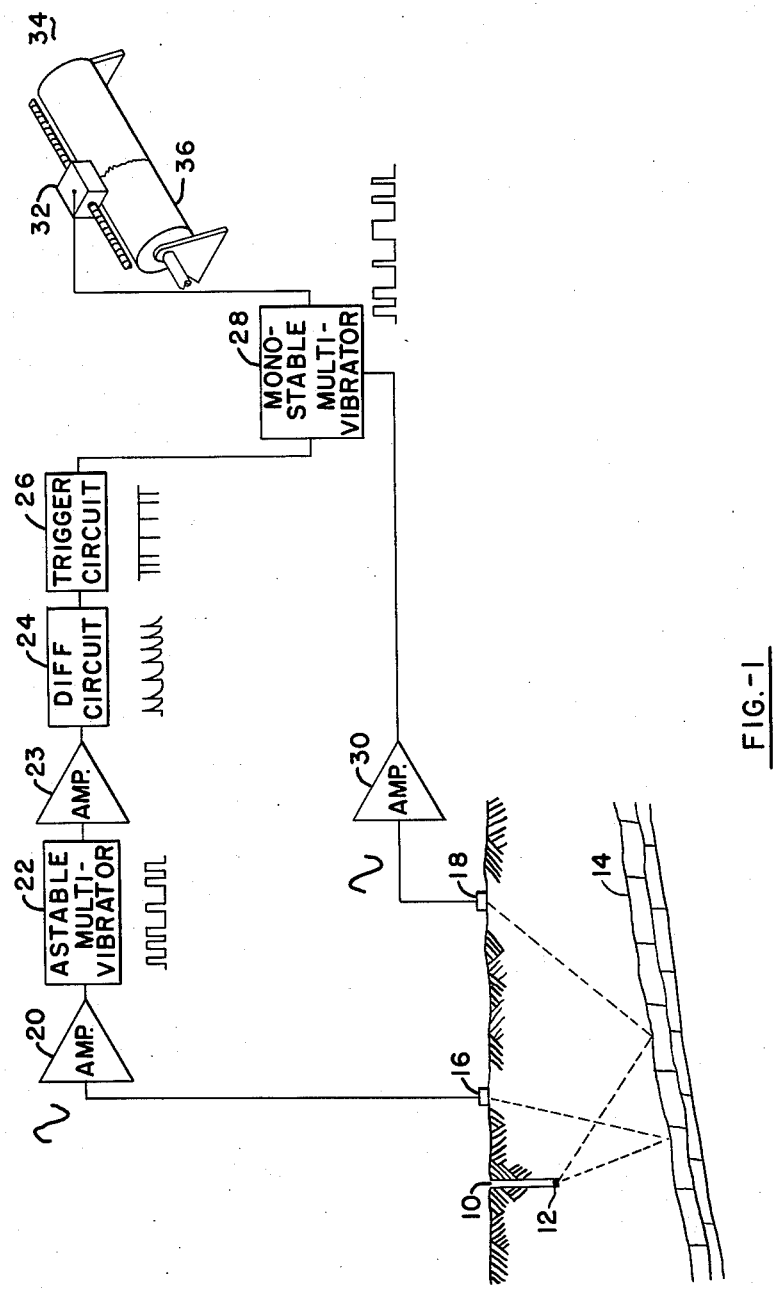
FIGURE 1 is a schematic block diagram of a system for recording simultaneously two seismic information signals as one signal.

Referring first to FIGURE 1, there is illustrated a shot point in a drill hole 10 in which a charge 12, which may be dynamite or other explosive, has been placed. Upon detonation of the explosive, seismic waves are passed through the earth's surface until they impinge upon an interface 14 between two substrata formations of different elastic properties. The waves are then reflected back toward the surface where they are detected by transducers which preferably are geophones 16 and 18. It is recognized that the signals detected by geophones 16 and 18 will not be identical due to their different positions with respect to the shot point. In practicing the invention, the seismic signal from geophone 16 will be used to vary the repetition rate of the pulses of a carrier signal, and the seismic signal from geophone 18 will be used to vary the width of the pulses of the same carrier signal. It will be noted in FIGURES 1 and 2 of the drawing that typical waveforms of the signals in various parts of the system have been included to better illustrate the invention. The carrier signal after thus being doubly modulated so as to contain the information of the seismic signals from both geophones 16 and 18 is then recorded. The seismic signal from geophone 16 has a frequency range of from about 10 to about 250 cycles per second with most recordings ranging from 20 to 100 cycles per second. It is thus seen that the system described herein should have a response that is flat from 10 to 100 cycles per second for normal operation. The signal-to-noise ratio of the system should be good and preferably in the range of about 200:1. The seismic signal from geophone 16 will, for convenience, be referred to as the first seismic signal and seismic signal from geophone 18 will be referred to as the second seismic signal although they are simultaneous signals. The first seismic signal from the geophone is fed to and amplified by amplifier 20. The output signal of amplifier 20 is fed to an astable multivibrator 22. An astable multivibrator is also referred to as a "free-running" multivibrator; and it is here characterized by being capable of producing an output signal whose repetition rate is a linear function of the voltage amplitude of the first seismic signal. With no input signal the astable multivibrator generates a series of positive pulses at a constant width and constant rate. The output signal from the astable multivibrator is fed to an amplifier 23 where it is amplified and then fed to differentiating circuit 24 which differentiates this signal. A trigger circuit 26 is electrically connected to the differentiating circuit and converts each output pulse of the differentiating circuit into a trigger peak. The output of the trigger circuit 26 is fed to a mono-stable multivibrator 28 which generates a rectangular pulse for each peak of the output of the trigger circuit 26. The term "mono-stable" is used to refer to a multivibrator circuit which has a stable operating condition with one tube conducting and the other tube non-conducting. Only when a trigger peak is received do the tubes change operating conditions and then only for a period determined by the circuit parameters. For each trigger peak received there is one pulse put out.

The path of the second seismic signal to the mono-stable multivibrator 28 is much shorter than the path of the first seismic signal. The second seismic signal from geophone 8 is amplified in amplifier 30. The output of amplifier 30 is fed to the mono-stable multivibrator 28 with the width of the output pulses of the multivibrator 28 being varied in proportion to the amplitude of the second seismic signal. It is thus seen that the repetition rate of the pulses of the carrier signal has been varied by the first seismic wave signal and the width of the pulse of the carrier signal has been varied or determined by the second seismic signal.

A recording head 32 is utilized to record the output signal from mono-stable multivibrator 28. A signal is recorded on a recording medium 34 which may preferably be a magnetic tape supported by a drum 36 which rotates the recording medium relative to the recording head. If magnetic tape is used as the recording medium, it is apparent that recording head 32 must be a magnetic recording head and may be any conventional type. In general such heads are tiny electro magnets whose air gaps are positioned in transverse relation to the direction of relative movement between the head and the magnetic recording medium. Magnetic flux through the air gaps is varied in response to the signals impressed upon the head; and the varying flux causes increasing variation in the magnetization of the recording medium.

Figure 2:
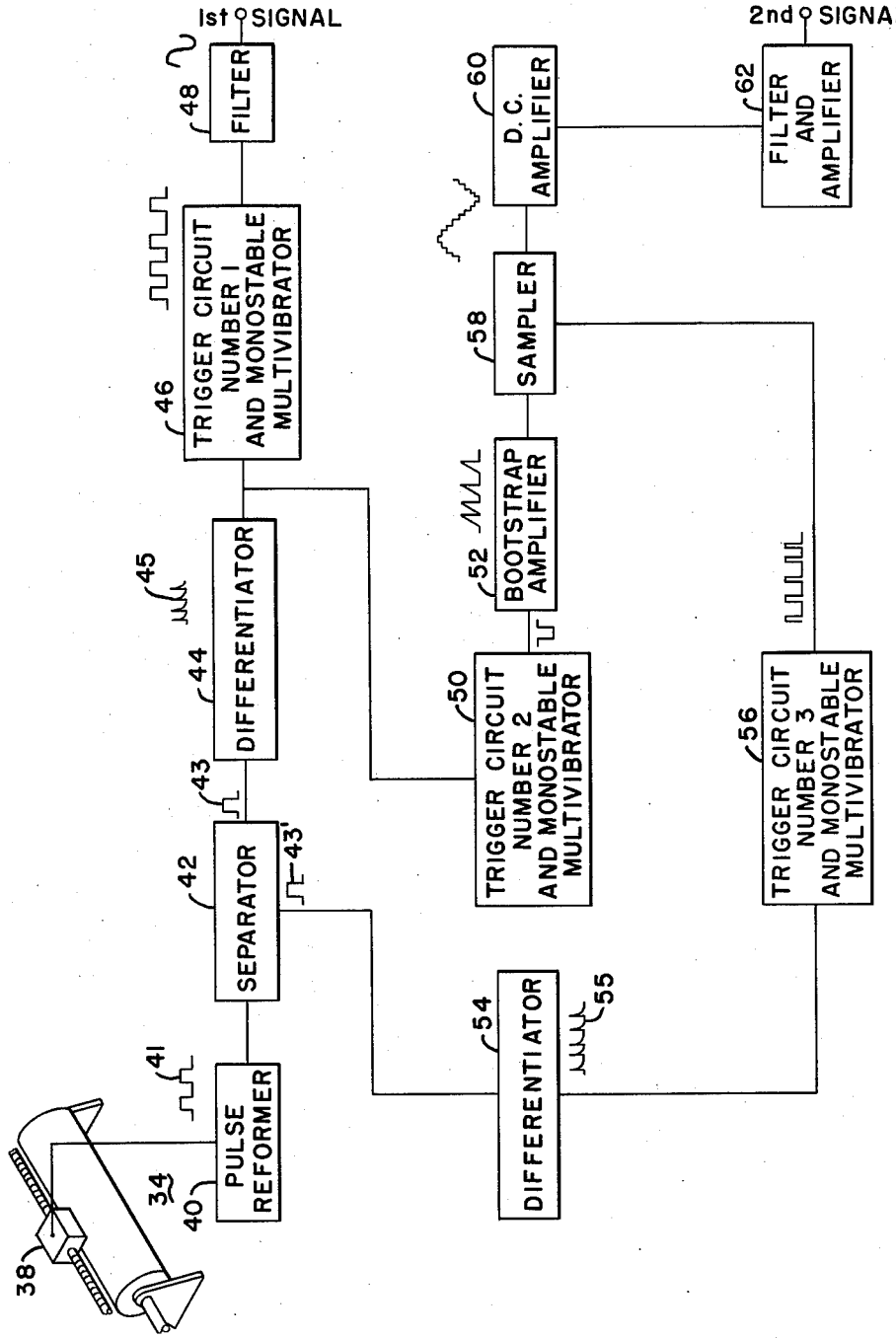
FIGURE 2 is a schematic diagram of a system for reproducing the two seismic information signals from the single recorded signal.

It will be noted that FIGURE 1 illustrates the best mode contemplated for recording the two seismic signals in the practice of the invention. Attention is now directed to FIGURE 2 which illustrates, in block diagram form, the best mode contemplated for recovering the two seismic signals from the single recorded signal. A reproducing magnetic head 38 reproduces the signal recorded on recording medium 34. The signal thus reproduced is fed to pulse reformer 40. A complete description of a suitable pulse reformer is found in an article by Max L. Van Doren entitled "Magnetic Recording of P.W.M. Signals," published in Electronics, May 1954, pages 232–242. The signal received from the reproducing head is thus shaped by pulse reformer 40 into rectangular-shaped pulses. These rectangular-shaped pulses are fed to separator 42 in the form of a phase splitter amplifier which generates two substantially rectangular output wave forms. One of the output wave forms illustrated at numerical designation 43 has its positive voltage increase be a function of the leading edge of the input pulse from the pulse reformer. The second output wave 43' from the separator has its positive voltage increase a function of the trailing edge of the input pulse from the pulse reformer. The second output wave form 43' from the separator will be left momentarily with attention being directed toward the path of waveform 43. It is seen from the figure that the first output waveform, that is the waveform whose positive voltage increase is a function of the leading edge of the input pulse from the pulse reformer, is fed to a differentiating circuit 44. The differentiating circuit generates the output signal 45 which has a sharp positive peak for each positive voltage rise in the first waveform. The output signal from differentiating circuit 44 is fed to a first trigger circuit and mono-stable multivibrator 46 which gives a positive, constant-width, rectangular pulse for each peak of the signal fed to it. These rectangular pulses are then fed to a conventional filter 48 which recovers the original seismic signal from the output wave signal of the first trigger circuit and mono-stable multivibrator. The signal thus recovered corresponds to the seismic signal originally received from geophone 16.

Attention is next directed to recovering a signal from the carrier signal which corresponds to the original signal generated by geophone 18. The output signal from differentiating circuit 44 is fed to a second trigger circuit and multivibrator 50 which generates an output signal with a negative rectangular pulse of fixed duration for each positive peak of the output waveform from differentiating circuit 44. A bootstrap amplifier 52 is electrically connected to receive the output of the second trigger circuit and multivibrator 50 and generates a signal whose voltage increases linearly with respect to time for the duration of the negative pulse of the output of the second trigger circuit and multivibrator. It is felt that the circuit may best be understood if attention is next directed to a second differentiating circuit 54 which generates an output waveform 55 which has a positive peak for each voltage rise in the second output waveform 43' from separator 42. A third trigger circuit and mono-stable multivibrator receives the signal from the second differentiating circuit 54 and is adapted to generate a waveform characterized by having a positive rectangular pulse for each peak from the output of the second differentiating circuit. A sampler 58 includes a capacitor which is adapted to assume the instantaneous voltage of the output of the bootstrap amplifier 52 at the time of the arrival of each pulse received from the third trigger circuit and mono-stable multivibrator 56, at which time the then or new instantaneous voltage of the output of the bootstrap amplifier is again assumed by the capacitor of the sampler. This operation is, of course, continually repeating. A D.C. amplifier 60 is connected to the sampler circuit in such manner that the cathode of the amplifier assumes the voltage of the capacitor of the sampler circuit 58. The output signal from amplifier 60 is passed through filter and amplifier means 62 in a conventional manner whereby the original second seismic information signal is recovered. The signal thus recovered from filter and amplifier 62 is identical in shape to the second original seismic signal that is generated by geophone 18.

Having thus described the nature, function and relationship of the various components of this invention, attention is next directed to FIGURES 3 and 4 in which is shown circuitry suitable for carrying out the invention. It will be recognized that a number of electronic and electrical components may be used to implement the systems shown in FIGURES 1 and 2. However, it is contemplated that the particular system shown in FIGURE 3 for recording two seismic signals simultaneously as one signal and FIGURE 4 which shows circuitry for reproducing these two signals constitute the best known systems contemplated for carrying out the invention. It will be noted that in FIGURES 3 and 4 that part of the circuitry corresponding to the various components of the block diagram of FIGURES 1 and 2 are enclosed in a dotted line and are given the same numerical designation as shown in the block diagrams and FIGURES 1 and 2.

Referring first to FIGURE 3, it will be noted that the first seismic information signal is fed to tube 66 which is a conventional class A amplifier. The output of the amplifier is coupled to the junction of the biasing voltage divider resistor 68 and 70 and the grid resistors 72 and 74 of the astable multivibrator 22 which has electronic tubes 76 and 78. Astable multivibrator 22 may be degenerative positive bias multivibrator of a conventional type and is characterized by having a frequency vs. grid voltage curve which is essentially linear from 1000 cycles per second to 3000 cycles per second. This is desired to give a wide range of modulation with minimum distortion of the information signal. The output of the multivibrator 22 is a square wave type signal with a repetition rate dependent on the amplitude of the grid voltage.

The signal output of astable multivibrator 22 is amplified by amplifier 23. Amplifier 23 has electronic tube 80 which may be of the same type as tube 66. The square wave output of the astable multivibrator which has been amplified is fed to differentiating circuit 24 which consists essentially of capacitor 82 and resistor 84. The positive pulse thus obtained is fed to the grid of tube 86 of trigger circuit 26. The trigger circuit has an output signal of a wave form characterized by having peaks which are used to trigger the modulating mono-stable multivibrator 28. The mono-stable multivibrator has an output signal which is characterized by having one pulse with steep or substantially vertical leading and trailing edges for each trigger pulse fed to it. The duration of the individual pulses is independent of the trigger pulses as will be seen.

To momentarily summarize the action of the circuit of FIGURE 3, it is seen that the first information seismic signal fed into the circuit acts upon the circuit so as to vary the repetition rate of the output pulses. The instantaneous frequency of the pulses is proportional to the instantaneous voltage of the input signal. The output signal has a frequency spectrum containing the fundamental carrier frequency, harmonics of the carrier, sum and difference frequencies of the carrier and the information signal and sum and difference frequencies of the carrier harmonics and the information signal.

The second information seismic signal which modulates the carrier pulse is amplified by amplifier 30. The output of this amplifier is fed to the grid of tube 88 of monostable multivibrator 28 where it varies the grid voltage thus varying the time of conduction of tube 88 and the width or duration time of the output pulses. The pulse duration time is determined by the grid voltage of tube 88 and the time constant of resistor 90 and capacitor 92. The various components of the mono-stable multivibrator 28 are designed so that pulse duration times vs. grid voltage curve is linear from 40 microseconds to 240 microseconds duration time. This is desirable to give a wide range of modulation with minimum distortion of the information signal.

The final output of the circuitry of FIGURE 3 is a continuous pulse train of varying repetition rate and pulse duration time. The circuit parameters are chosen so the repetition rate with the first seismic signal being zero would be about 2000 pulses per second. A modulator swings this from between 1000 and 3000 pulses per second. The pulse duration time is set so that the zero modulation width is 150 microseconds. The modulating signal varies this between limits of 75 microseconds and 225 microseconds.

Referring now to FIGURE 4, it is seen that a more detailed demodulating circuit is illustrated. The modulated carrier waveform is reproduced from the recording medium and is reformed in pulse reformer 40 as hereinbefore described and illustrated in FIGURE 2. The modulated carrier waveform as reshaped is then put on the grid of electronic tube 94 of the separator circuit 42. Tube 94 is an amplifier with approximately unity gain and is commonly known as a "phase splitter." The resistance of plate resistor 96 is equal to the cathode resistance of resistors 98 and 100. The output from the plate of tube 94 is 180° out of phase with the output of the cathode of tube 94. Therefore if the input to the demodulator circuit is considered as a series of positive pulses with the pulse duration time modulated so that the trailing edge of the pulse is the variable, then the output of the cathode of tube 94 is also such a signal. The output of the plate circuit can be considered as a series of positive pulses with the leading edge variable, as the leading edges of these pulses coincide in time to the trailing edges of the input pulses fed to separator 42.

Attention will first be directed toward that part of the path of the demodulation circuitry of FIGURE 4 which is utilized primarily for demodulating the frequency-modulated portion of the carrier signal. The output from the cathode of tube 94 is fed to differentiating circuit 44 which includes capacitor 102 and resistor 104. A diode 106 is included to suppress the negative spikes which are contributed by the trailing edges of the pulses. The positive spikes from the differentiating circuit 44 which were developed by the leading edges of the input pulses of the separator circuit 42 are fed to tube 108 of a first trigger circuit and mono-stable multivibrator unit 46. Tube 108 is used to trigger tubes 110 and 112 of the mono-stable multivibrator. The output signal of the multivibrator taken from the plate of tube 112 is a series of pulses of variable repetition rate and of constant pulse duration time. The output from tube 112 is then fed to integrating filter circuit 48 which eliminates all but a preselected band of seismic frequencies and has an output signal which is identical to the first information seismic signal which was originally fed to the frequency modulating portion of the modulating circuit.

Having described the circuitry of FIGURE 4 used for demodulating the frequency-modulated portion of the carrier signal, attention is now directed toward that part of the circuitry of FIGURE 4 concerned with demodulating the second information seismic signal which is pulse-width modulated. The pulse-width demodulator uses trigger spikes from both the leading edge and the trailing edge of the input pulses illustrated at 45 and 55. The leading edge positive spike developed in differentiating circuit 44 is fed through capacitor 114 to the grid of tube 116 which triggers the tubes 118 and 120. The output of the second trigger circuit and mono-stable multivibrator circuitry 50 is taken from the plate of tube 120 and is a negative pulse. The negative pulse output from tube 120 is fed to the grid of tube 122 of the bootstrap amplifier 52. The negative pulse holds tube 122 in a cut-off condition allowing capacitor 124 to charge linearly in the bootstrap circuit 52. The bootstrap circuit as used herein is a modification of a circuit shown in Waveforms published by Britton Chance et al., New York, 1949, pages 267–274. As long as tube 122 is held in its cut-off condition, the capacitor 124 charges at a linear rate. The voltage on capacitor 124 is fed to the grid of the cathode follower 126; it is thus seen that the voltage on resistor 128 also rises linearly with time. Tubes 130 and 132 are normally biased to cut-off.

In order to more clearly follow the pulse width demodulating portion of the circuitry, attention is now returned to tube 94 to follow the path of the trailing edges of the input pulses 41. The output signal of the plate of tube 94 is differentiated by differentiator circuit 54 comprising a capacitor 134 and resistor 136. The positive spikes at this point are derived from what were the trailing edges of the original modulated pulses. The positive spikes are applied to the grid of tube 138 which triggers tubes 140 and 141 of a third trigger circuit and mono-stable multivibrator 56.

The output of tube 140 is a positive pulse of short duration which is applied to the grids of tubes 130 and 132 of the sampler circuit. When these sampler tubes 130 and 132 conduct, they allow the capacitor 142 to assume the instantaneous voltage on resistor 128. This in effect means that the voltage on capacitor 142 is determined by the pulse duration time of each pulse illustrated as 41. The leading edge of the pulse illustrated at 41 starts the linear voltage increase across resistor 128 and the trailing edge of the pulse determines when that voltage is sampled by capacitor 142. Capacitor 142 substantially holds its charge until the next succeeding sample pulse allows a change. The resistor 144 and capacitor 146 integrate the voltage on capacitor 142 and apply it to the grid of tube 148 of the D.C. amplifier circuit 60. The output of the cathode follower, tube 148, is filtered and amplified by filter and amplifying circuit 62 which includes tubes 150 and 152 whereby the final output signal of tube 152 is identical to the second seismic information signal which was originally used to modulate the duration time of the carrier pulses.

It will be understood that several of the components of the circuits described herein in detail are intended to be illustrative of the invention and various modifications can be made therein without departing from the scope of the invention. For example the multivibrator circuits could be designed for the use of transistors instead of vacuum tubes. Circuit components could be changed to give different pulse repetition rates and/or pulse duration times without changing the principle of operation.

The novel modulating and demodulating systems described herein are capable of wide application in the electronic field, for example they may be effectively used for modulating a carrier with any pair of audio or sub-audio frequency signals. Other applications will be apparent to those skilled in the art.

What is claimed is:

1. In a system for recording two seismic wave signals simultaneously as one signal on a recording medium, the combination comprising an amplifier for receiving and amplifying a first of said seismic signals, an astable multivibrator electrically connected to said amplifier and being characterized by being capable of producing an output signal whose repetition rate is a linear function of the amplitude of said first signal, a differentiator circuit electrically connected to the output of said astable multivibrator and adapted to amplify and differentiate the output of said astable multivibrator, a trigger circuit electrically connected to the differentiating circuit and adapted to convert each output pulse of said differentiating circuit into a trigger peak, a mono-stable multivibrator adapted to generate a rectangular pulse for each said peak of the output of said trigger circuit, a second amplifier for amplifying the second of said seismic signals electrically connected to said mono-stable multivibrator whereby the width of the output pulses of said multivibrator are varied in proportion to the amplitude of said second seismic signal, recording means electrically connected to the output of said mono-stable multivibrator and a recording medium movable relative to said recording means.

2. In a system as defined in claim 1, the further improvement whereby said trigger circuit is adapted to invert the output signal from said differentiating circuit.

3. In a system for recovering two individual seismic signals which have been simultaneously recorded as a single signal on a recording device wherein one of said seismic signals has varied the repetition rate of the pulses of the carrier signal and the other of said seismic signals has varied the width of the pulses of said carrier signal, the combination comprising a pulse reformer electrically connected to the reproducing head of said recording device and adapted to shape the signal received from the recording medium into rectangular shaped pulses, a separator circuit electrically connected to the output of said pulse reformer and adapted to generate two substantially rectangular output waveforms with one of said waveforms having its positive voltage increase a function of the leading edge of the input pulse from said pulse reformer and the second of said waveforms having its positive voltage increase a function of the trailing edge of the input pulse from said pulse reformer, a differentiating circuit adapted to generate an output signal having a sharp positive peak for each positive voltage rise in first said waveform, a first trigger circuit and mono-stable multivibrator adapted to give a positive constant width rectangular pulse for each said peak of the output of said differentiating circuit, a filter adapted to recover the original seismic signal from the output wave signal of said first trigger circuit and mono-stable multivibrator, a second trigger circuit and mono-stable multivibrator adapted to generate an output signal with a negative rectangular pulse of fixed duration for each positive peak of the output waveform from said differentiating circuit, a bootstrap amplifier adapted to generate a signal whose voltage increases linearly with respect to time for the duration of the negative pulse of the output of said second trigger circuit and multivibrator, a second differentiating circuit adapted to generate an output waveform characterized by having a positive peak for each positive voltage rise in said second output waveform from said separator, a third trigger circuit and mono-stable multivibrator adapted to generate a waveform characterized by having a positive rectangular pulse for each peak from said second differentiating circuit, a sampler circuit including a capacitor which is adapted to assume the instantaneous voltage of the output of the bootstrap amplifier at the time of the arrival for each pulse received from said third trigger circuit and mono-stable multivibrator and hold said voltage until another pulse is received from said third trigger circuit and vibrator at which time the then instantaneous voltage of the output of the bootstrap amplifier is again assumed by said capacitor, a D.C. amplifier whose grid is connected to said sampler circuit whereby the cathode of said amplifier assumes the voltage of said capacitor, and means for filtering and amplifying the output signal from said D.C. amplifier whereby the original second seismic information signal is recovered.

References Cited in the file of this patent

UNITED STATES PATENTS

| 2,419,292 | Shepard | Apr. 22, 1947 |
| 2,578,133 | Hawkins | Dec. 11, 1951 |
| 2,583,484 | Gaunella | Jan. 22, 1952 |

OTHER REFERENCES

Telemetering in Earth Satellites, Electrical Engineering, vol. 76, No. 11, November 1957, pp. 976–981.